(12) United States Patent
Biter et al.

(10) Patent No.: US 6,584,856 B1
(45) Date of Patent: Jul. 1, 2003

(54) METHOD OF SENSING STRAIN IN A MATERIAL BY DRIVING AN EMBEDDED MAGNETOELASTIC FILM-COATED WIRE TO SATURATION

(76) Inventors: William J. Biter, 515 Schoolhouse Rd., Kennett Square, PA (US) 19348; Sung J. Oh, 342 Harshaw Dr., Chester Springs, PA (US) 19425; Stephen M. Hess, 300 Baywood Rd., West Chester, PA (US) 19382

( * ) Notice: Subject to any disclaimer, the term of this patent is extended or adjusted under 35 U.S.C. 154(b) by 0 days.

(21) Appl. No.: 09/651,806

(22) Filed: Aug. 30, 2000

(51) Int. Cl.$^7$ ................................................. G01B 7/16

(52) U.S. Cl. ..................... 73/768; 73/862.335

(58) Field of Search .................. 73/779, 768, 862.333, 73/862.335; 324/209

(56) References Cited

U.S. PATENT DOCUMENTS

| | | | | |
|---|---|---|---|---|
| 3,774,134 A | * | 11/1973 | Kardashian et al. | 336/20 |
| 3,863,501 A | * | 2/1975 | Janssen et al. | 73/861.24 |
| 4,233,848 A | * | 11/1980 | Sato et al. | 73/727 |
| 5,600,239 A | * | 2/1997 | Hathaway et al. | 324/209 |
| 5,717,330 A | * | 2/1998 | Moreau et al. | 324/207.13 |

* cited by examiner

Primary Examiner—Max Noori

(57) ABSTRACT

A method of sensing strain in a material includes the steps of embedding in a material at least one wire formed of a conductive core and a magnetoelastic film coated around the conductive core and having a known level of saturation, interconnecting an input lead to one end portion of the wire and an output lead to another end portion of the wire, inputting an electrical current in the wire through the input lead so as to drive the magnetoelastic film of the wire to saturation such that the electrical impedance is sensitive to changes in strain in the material, and outputting an electrical signal from the output lead being proportional to a strain imposed on the material surrounding the wire.

9 Claims, 5 Drawing Sheets

METHOD OF SENSING STRAIN IN A MATERIAL BY DRIVING AN EMBEDDED MAGNETOELASTIC FILM-COATED WIRE TO SATURATION

BACKGROUND OF THE INVENTION

Field of the Invention

The present invention generally relates to sensing strain in materials and, more particularly, is concerned with a method of sensing strain in a material by driving an embedded magnetoelastic film-coated wire to saturation.

Description of the Prior Art

A variety of methods may be used to measure strain in materials. A common method uses the change in resistance with strain. Conventional foil sensors and silicon-based resistive sensors use this method, but both of these sensors are bulky. More recent types of sensors include fiber optics sensors which can be used to measure strain.

It is well-known that magnetoelastic materials are stress sensitive. Magnetoelastic materials will change their magnetic properties under an applied stress and thus have been employed to measure strain. Magnetoelastic-based sensors are disclosed in U.S. Pat. No. 3,774,134 to Kardashian et al. and in U.S. Pat. No. 3,863,501 to Janssen et al. In the Kardashian et al. and Janssen et al. patents, wires plated with magnetoelastic material are disclosed. The plated wires of the Kardashian et al. and Janssen et al. patents have a composition which is controlled around the circumference of the wire such that a portion of the wire will have a negative magnetoelastic effect and a portion of the wire will have a positive magnetoelastic effect. The plated wires of the Kardashian et al. and Janssen et al. patents are fabricated with non-zero magnetoelasticity. The plated wires of the Kardashian et al. and Janssen et al. patents can be used to monitor stress by virtue of one half of each wire having a negative magnet elasticity and the other half of each wire having a positive magnetoelasticity.

While prior art magnetoelastic-based sensors, such as those which are disclosed in the Kardashian et al. and Janssen et al. patents, may function satisfactorily in some uses, a need still remains for a more effective strain sensing means which will provide a more optimum solution for measuring strain in materials.

SUMMARY OF THE INVENTION

The present invention provides a method of sensing strain in a material which is designed to satisfy the aforementioned need. The strain sensing method of the present invention drives a magnetoelastic film on a conductive wire to saturation. At least one wire formed of a conductive core surrounded and coated externally by a magnetoelastic film is employed. The magnetoelastic film of the wire is fully magnetized at its saturation point which provides an optimum degree of sensitivity in measuring the strain of a material which surrounds the wire or, in other words, in which the wire is embedded.

Accordingly, the present invention is directed to a method of sensing strain in a material which comprises the steps of: (a) embedding in a material at least one wire formed of a conductive core and a magnetoelastic film coated around the conductive core and having a known level of saturation; (b) interconnecting an input lead to one end portion of the wire and an output lead to another end portion of the wire; (c) inputting an electrical current in the wire through the input lead so as to drive the magnetoelastic film of the wire to saturation such that the electrical impedance is sensitive to changes in strain in the material; and (d) outputting an electrical signal from the output lead being proportional to a strain imposed on the material surrounding the wire.

More particularly, the material is a composite material. The wire is a plurality of wire segments interconnected in series and embedded in the material. A plurality of input leads and a plurality of output leads are provided such that one input lead is interconnected to one end portion and one output lead is interconnected to another end portion of each of the wire segments. The electrical current is inputted in each of the wire segments through the input leads so as to drive the magnetoelastic film of each wire segment to saturation such that the electrical impedance is sensitive to changes in strain in the material and an electrical signal is outputted from each output lead proportional to a strain imposed on the material surrounding the wire segment to which the output lead is interconnected. The magnetoelastic film has a thickness ranging from about 1 micrometer to about 100 micrometers and is composed of an electrodeposited nickel and iron alloy. The magnetoelastic film is continuous and uniform around the conductive core of the wire and increases the impedance of the wire.

The present invention is also directed to a method of monitoring the curing of a material which comprises the steps of: (a) embedding in a material which is uncured at least one wire formed of a conductive core and a magnetoelastic film coated around the conductive core and having a known level of saturation; (b) interconnecting an input lead to one end portion of the wire and an output lead to another end portion of the wire; (c) inputting an electrical current in the wire through the input lead so as to drive the magnetoelastic film of the wire to saturation such that the electrical impedance is sensitive to changes in the extent of curing of the material; and (d) outputting an electrical signal from the output lead being proportional to the extent of curing of the material surrounding the wire.

The present invention is also directed to a method of limiting current from a source of electrical power which comprises the steps of: (a) providing a source of alternating current; (b) providing a load for receiving the alternating current; and (c) connecting between the source of alternating current and the load at least one wire formed of a conductive core and a magnetoelastic film coated around the conductive core for limiting a maximum amount of alternating current flowing to the load.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
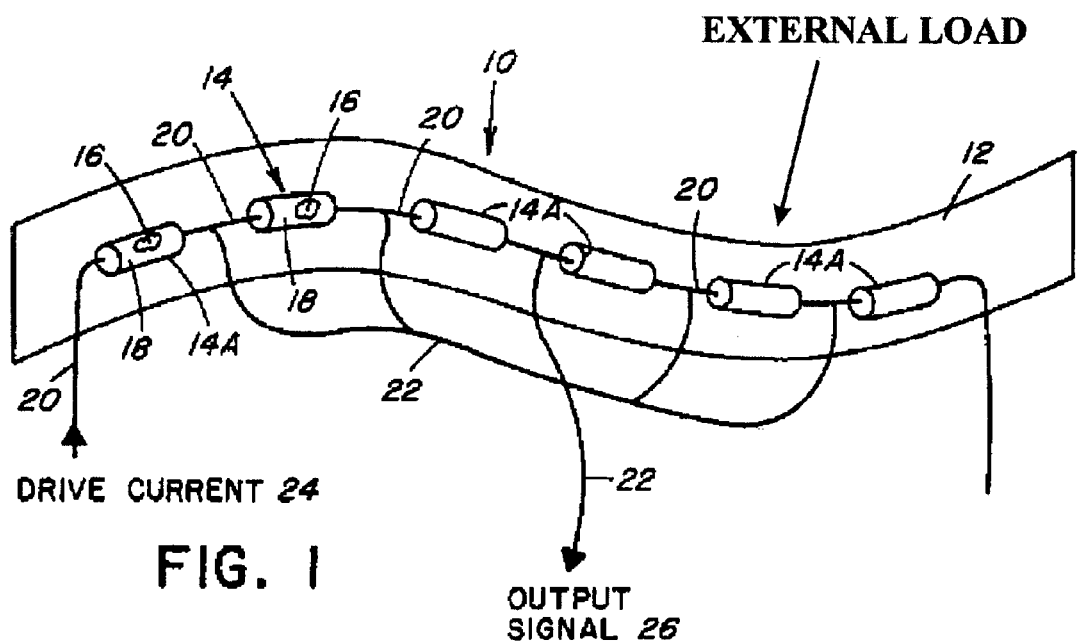
FIG. 1 is a diagrammatic representation of a method of sensing strain in a material of the present invention.

Referring to the drawings and particularly to FIG. 1, there is illustrated a representation of a method of sensing strain in a material, generally designated 10, of the present invention. The strain sensing method 10 basically includes the steps of embedding in a material 12 at least one wire 14 formed of a conductive core 16 and a magnetoelastic film 18 coated around the conductive core 16 and having a known level of saturation, interconnecting an input lead 20 to one end portion of the wire 14, interconnecting an output lead 22 to another end portion of the wire 14, inputting an electrical current 24 in the wire 14 through the input lead 20 so as to drive the magnetoelastic film 18 of the wire 14 to saturation such that the electrical impedance is sensitive to changes in strain in the material 12 and outputting an electrical signal 26 from the output lead 22 that is proportional to a strain imposed on the material 12 surrounding the wire 14.

The material 12 may be a composite material. The wire 14 may be a plurality of wire segments 14A interconnected in series and embedded in the material 12, as shown in FIG. 1. A plurality of input leads 20 and a plurality of output leads 22 may be provided such that one input lead 20 is interconnected to one end portion and one output lead 22 is interconnected to another end portion of each of the wire segments 14. The electrical current 24 may be inputted on each of the wire segments 14 through the input leads 20 so as to drive the magnetoelastic film 18 of each wire 14 to saturation such that the electrical impedance is sensitive to changes in strain in the material 12 and an electrical signal 26 may be outputted from each output lead 22 proportional to a strain imposed on the material 12 surrounding each of the wire segments 14A.

The magnetoelastic film 18 of the wire 14 may have a thickness ranging from about 1 micrometer to about 100 micrometers. The magnetoelastic film 18 can be a coating of an electrodeposited nickel and iron alloy. The film can be electro plated or deposited from a nickel chloride/nickel sulfate with iron bath. A typical bath composition consists of 150 grams/liter of nickel sulfate, 120 grams/liter of nickel chloride and 53 grams/liter of boric acid. To improve the plating, various additives can be added to the bath. This reduces the stress and improves the brightness of the film. Examples of such additives obtained from Enthone-OMI, Inc. are Brightener 4: 1.5% vol. and Brightener 63: 3.0% vol. Iron is introduced by either adding a soluble form of Fe(2+), such as FeCl(2) or by using an iron anode. Iron is introduced, using one of these techniques, to bring the Fe(2+) concentration to a level of 5.9 grams/liter. To keep this iron in solution, a stabilizer is added, using a proprietary brand such as Enthone-OMI, Inc. Niron Stabilizer LC, added at a rate of 13 grams/liter. The actual bath composition can be varied over wide limits but it is desired to keep what has been specified to maintain the magnetostrictive film properties. The bath temperature is adjusted in the range from about 40 to 70 degrees celsius and the pH of the bath is held from about 2.5 to 5 with a general operating point being a temperature of about 50 degrees celsius and a pH of about 3.2.

The conductive core 16 of the wire 14 is generally copper but can be any other suitable type of wire. The conductive core 16 is immersed in the bath and a negative voltage is applied. The current is controlled depending on the area of the cathode, with a typical plating current of 50 amps/ft(2) of cathode area but may be varied from 10 amps/ft(2) to 500 amps/ft(2). The diameter of the conductive core 16 may vary from about 0.001 inches to about 0.10 inches depending on the properties desired with the best results occurring around 0.005 to 0.010 inches. The field in the magnetic film varies as 1 over the radius of the wire. To saturate the magnetoelastic film at modest drive currents requires a diameter wire. The conductive core 16 is desired to be as uniform as possible. It is generally desirable to have the anodes of the plating bath, which may be nickel or a combination of nickel and iron or an inert material such as Ti, at a suitable distance from the conductive core 16 to minimize non-uniformities in the plating. The ideal configuration would be a circular anode around the conductive core 16, though plate-type anodes can replace this arrangement if located at a suitable distance from the conductive core 16. The conductive core 16 generally rotates slightly during the deposition since the solution has to be agitated. This motion of the conductive core 16 is also useful for ensuring controlled thickness around the circumference of the core 16. The magnetoelastic film 18 is continuous and uniform around the conductive core 16.

The magnetoelastic film 18 is desired to be plated at 80/20 nickel to iron composition. This is the zero point for the magnetoelasticity and typically would have minimal stress sensitivity. However, the plating process introduces additional stresses in the magnetoelastic film 18. Typically, magnetoelastic films 18 which are plated with the above-described conditions have measured in the range of 75 to 80% nickel with the remainder being iron, as determined by dissolving the magnetoelastic film 18 in an acid and analyzing the resulting solution. Thus, an essentially zero magnetoelastic film 18 with stresses introduced during the plating process is used.

Figure 2:
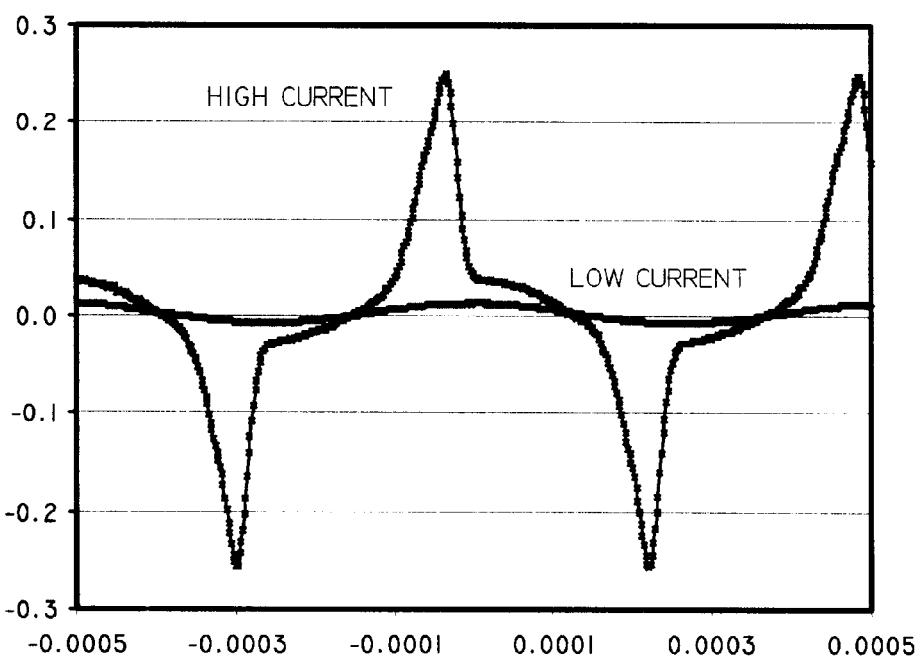
FIG. 2 is a graph showing voltage output versus time with a wire driven at two current levels with a sinusoidal driving current.
Figure 3:
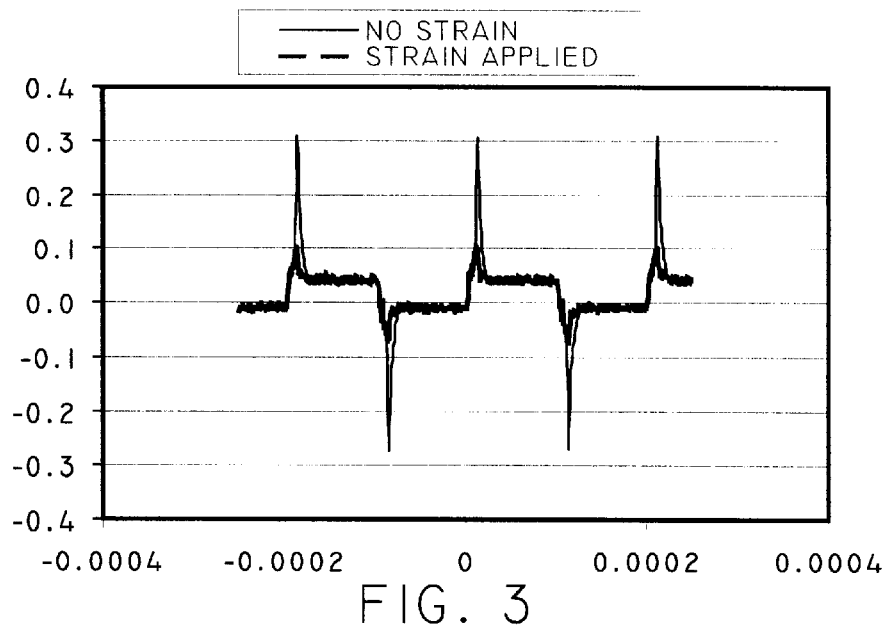
FIG. 3 is a graph showing voltage output versus time for stressed and unstressed magnetoelastic film with a square wave excitation.
Figure 4:
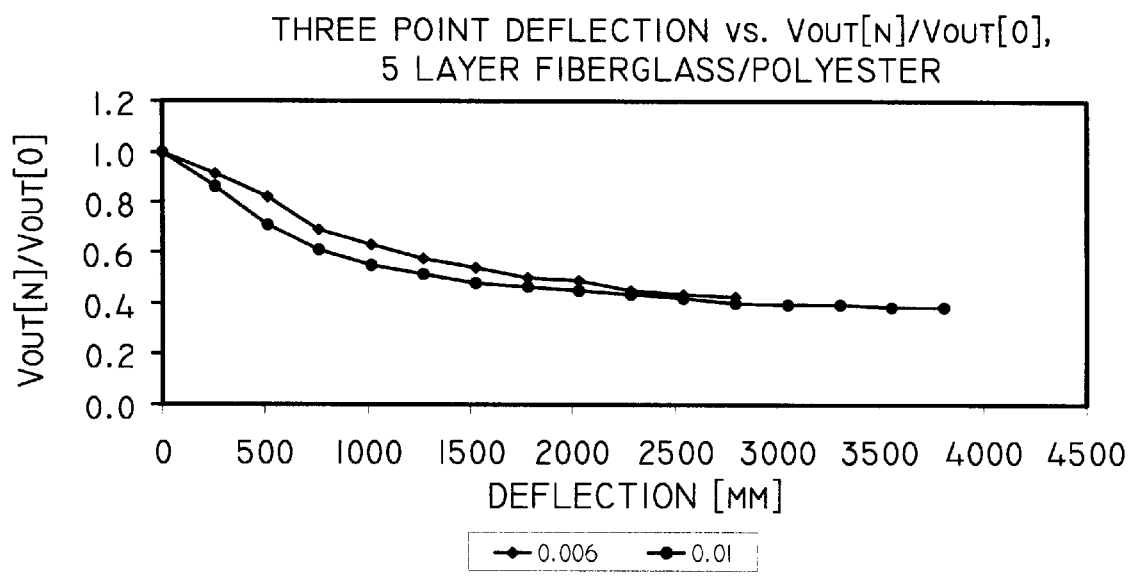
FIG. 4 is a graph showing voltage output of the wire embedded in a composite material with external deflections applied to introduce strain in the composite material.

Referring now to FIGS. 2–4, the magnetoelastic film 18 appears electrically as a lossy inductor. The inductance of the magnetoelastic film-coated wire 14 has increased significantly compared to a bare wire. An additional effect is a significant increase in the loss with increasing drive current, as shown in FIG. 2 where the voltage output versus time with a wire driven at two current levels with a sinusoidal driving current is plotted. At lower current, the output is approximately sinusoidal. At a higher current, the impedance, as measured by the voltage, shows a sharp spike. This spike is believed to be an increase in the hysteresis loss of the magnetoelastic film 18 as the wire 14 is driven into saturation. The magnetoelastic film 18 increases the impedance of the wire 14. This change in effective impedance can be used to limit the current. Changes in this portion of the output signal are very strain sensitive. Previous sensors using magnetoelastic materials relied on changes in the permeability with changes in stress or strain. Although the coated wires have such changes, the changes occurring when the magnetoelastic film 18 is driven into saturation are more pronounced and more easily used to monitor the external stresses.

This highly non-linear effect with higher current results in higher order harmonics in the voltage output compared to the base drive frequency. This allows very simple techniques to be used to measure the output signal. An example of this is shown in FIG. 3 where the voltage output versus time for stressed and unstressed magnetoelastic film 18 with a square wave excitation is plotted. The driving signal is replaced by a square wave. A very strong decrease in the spike with strain is shown. This information can be easily filtered out using conventional techniques. Since the wire 14 has a small diameter, the magnetic field required to saturate the magnetoelastic film 18 could be produced at low currents. The required current depends on the wire 14 diameter but the example shown in FIG. 2 has a 0.010 inch diameter wire and the output signal is generated with 0.8 amps rms. drive current. Smaller wires require less current and larger wires require more current to drive the magnetoelastic film 18 into saturation.

Since the magnetoelastic film 18 is sensitive to strain, it may be embedded into a material 12. Likely candidates include composites and other structures that are fabricated by either pouring or molding or similar techniques. The wire 14, which is small and has minimal effect on the structure, can be used to monitor stress in the structure. The measurements of a fiberglass epoxy system with an embedded wire 14 are shown in FIG. 4 where the voltage output of the wire 14 embedded in a composite material 12 with external deflections applied to introduce strain in the composite material 12 is plotted.

Figure 5:
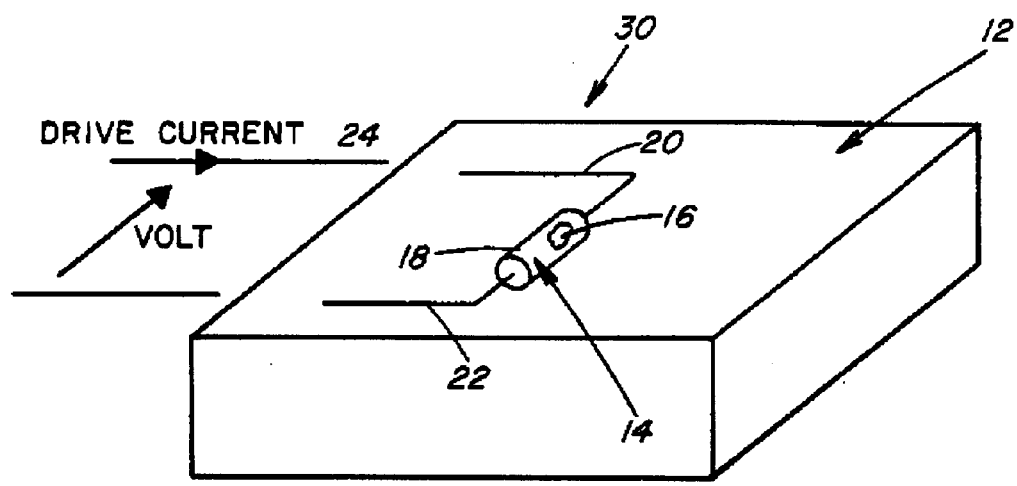
FIG. 5 is a diagrammatic representation of a method of monitoring the curing of a material of the present invention.
Figure 6:
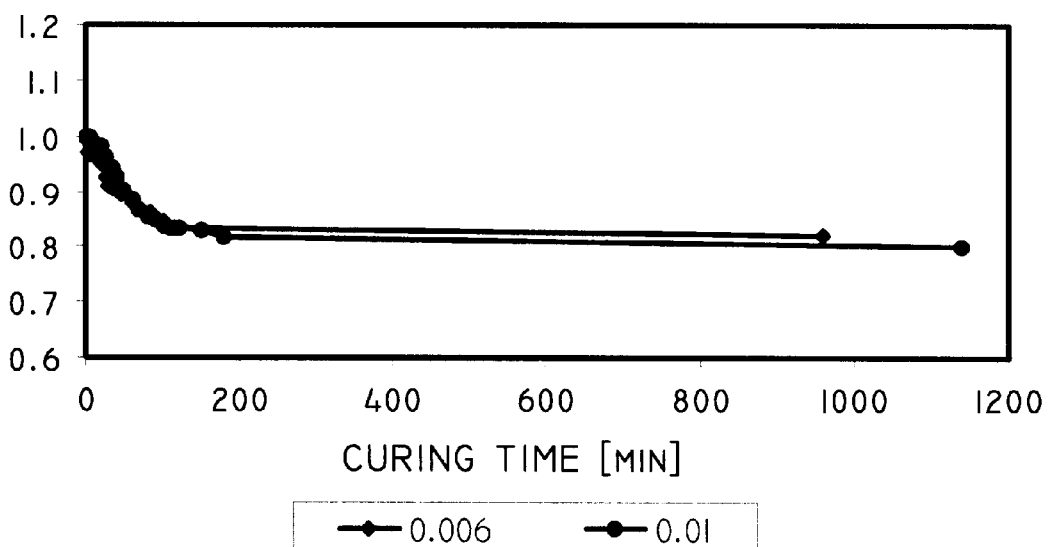
FIG. 6 is a graph showing voltage output of the wire embedded in an uncured resin/fiberglass while it cures.

Referring now to FIGS. 5 and 6, there is illustrated a representation of a method of monitoring the curing of a material, generally designated 30, of the present invention. The curing monitoring method 30 basically includes the steps of embedding in a material 12 which is uncured at least one wire 14 formed of the conductive core 16 and magnetoelastic film 18 coated around the core 16 and having the known level of saturation, interconnecting an input lead 20 to one end portion of the wire 14, interconnecting an output lead 22 to another end portion of the wire 14, inputting an electrical current 24 in the wire 14 through the input lead 20 so as to drive the magnetoelastic film 18 of the wire 14 to saturation such that the electrical impedance is sensitive to changes in the extent of curing of the material 12, and outputting an electrical signal 26 from the output lead 22 being 4 proportional to the extent of curing of the material 12 surrounding the wire 14. The wire 14 is embedded in the material 12 prior to curing. A form filled with an uncured resin is shown in FIG. 5. The application extends to any curing system where the binding agent is liquid at some point in the curing system. Following a reaction, either with heat or time, the uncured resin cures and this change can be detected, as shown in FIG. 6 where the voltage output of the wire 14 embedded in an uncured resin/fiberglass while it cures is plotted.

Figure 7:
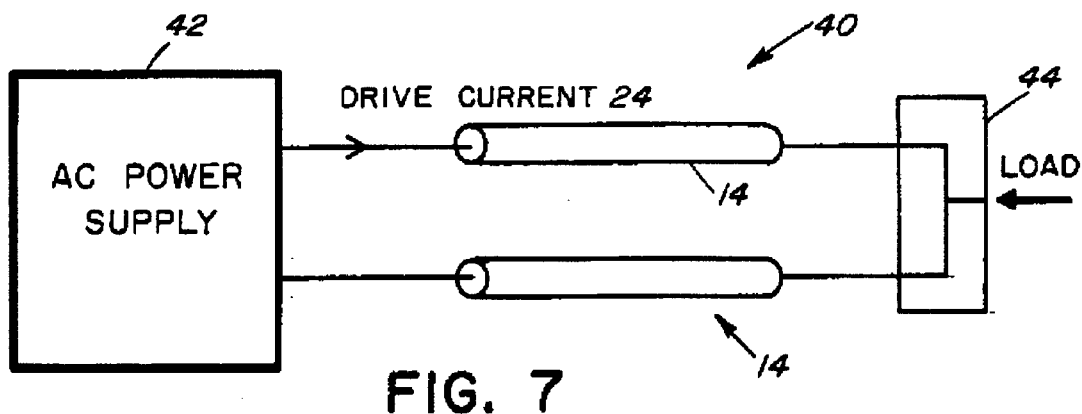
FIG. 7 is a diagrammatic representation of a method of limiting current from a source of electrical power of the present invention.
Figure 8:
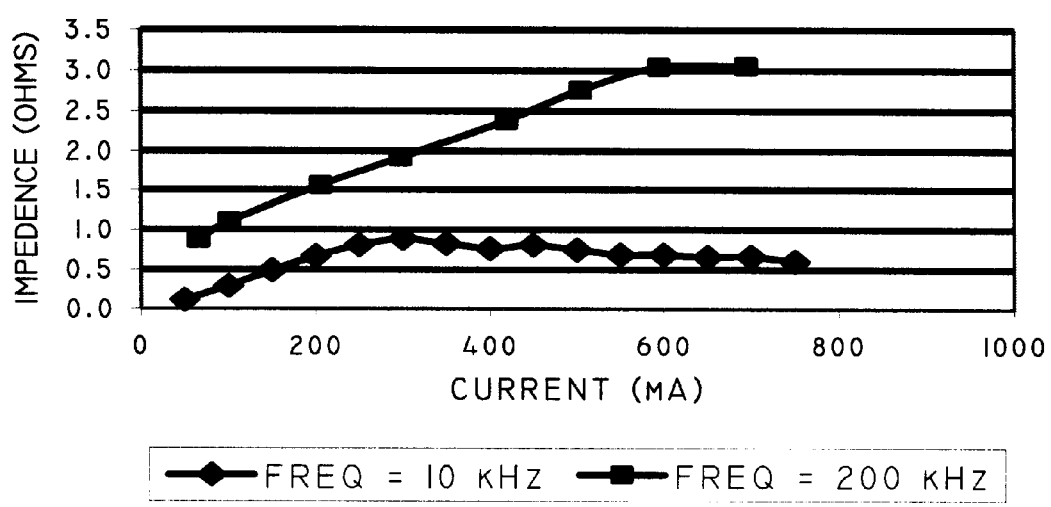
FIG. 8 is graph showing impedance versus current in the wire at two different frequencies.
Figure 9:
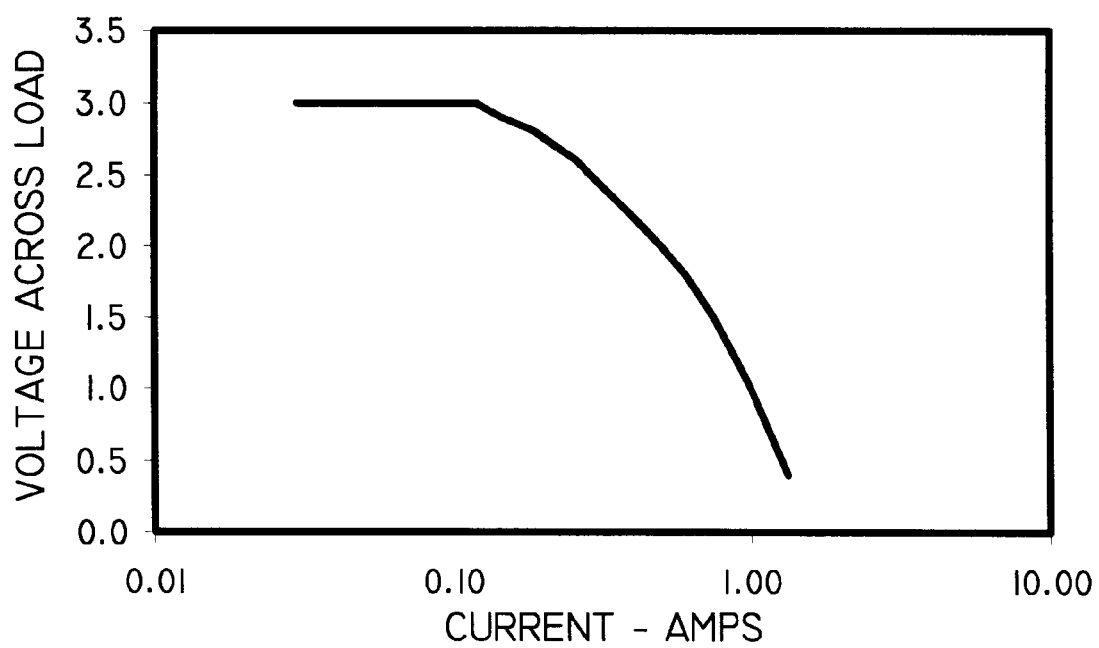
FIG. 9 is a graph showing voltage across a load versus current during use of the current limiting method.

Referring now to FIGS. 7–9, there is illustrated in FIG. 7 a representation of a method of limiting current from a source of electrical power, generally designated 40, of the present invention. The current limiting method 40 basically includes the steps of providing a source of alternating current 42, providing a load 44 for receiving the alternating current 42 and connecting between the source of alternating current 42 and the load 44 at least one wire 14 formed of the conductive core 16 and magnetoelastic film 18 coated around the core 16 for limiting a maximum amount of alternating current 42 flowing to the load 44. These wires may be arranged in a bundle to handle larger currents. As depicted in FIGS. 8 and 9, the impedance of the wire 14 increases with increasing alternating current 42. This feature of the wire 14 allows it to serve as a passive current limiter or surge suppressor to provide protection for power lines and switching power supplies. An example is shown in FIG. 8 where the impedance versus current 42 in the wire 14 at two different frequencies is plotted. The frequencies are 1 kHz and 10 kHz. As is evident at both frequencies, the wires 14 have low impedance at driving currents of less than approximately 100 ma. The observed output waveforms are also sinusoidal with no phase shift from the input driving current. Above 100 ma, the impedance of the wire 14 starts to increase dramatically with increasing drive current until a maximum (saturation) value is reached at approximately 600 ma. A passive device with these properties can be used to limit surges and spikes occurring from transients and noise for power lines. One possible use for such a passive device would be to provide passive protection for switching power lines. In this configuration, the wire length and geometry would be selected so it would have minimal impedance compared to the load 44 at the rated current 42. As the current 42 increases, more of the applied voltage drops across the wire 14 and less across the load 44 while the total current 42 from the power supply is limited. This is shown in FIG. 9 where the voltage across a load 44 versus current 42 during use of the current limiting method 40 is plotted. This plots the voltage appearing across the load 44 with a constant input voltage as the load resistance is lowered. With a constant input voltage, the current 42 would increase significantly without the wire 14 as a load limiter.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A method of sensing strain in a material, said method comprising the steps of:

(a) embedding in a material at least one wire formed of a conductive core and a magnetoelastic film coated around the conductive core and having a known level of saturation;

(b) interconnecting an input lead to one end portion of the wire and an output lead to another end portion of the wire;

(c) inputting an electrical current in the wire through the input lead so as to drive the magnetoelastic film of the wire to saturation such that the electrical impedance is sensitive to changes in strain in the material, thereby causing a highly non-linear increase in impedance of the wire; and (d) outputting an electrical voltage signal from the output lead, said output voltage signal having a spike which changes in amplitude to a strain imposed on the material surrounding the wire.

2. The method of claim 1 wherein the material is a composite material.

3. The method of claim 1 wherein the wire is a plurality of wire segments interconnected in series and embedded .in the material.

4. The method of claim 3 wherein a plurality of input leads and a plurality of output leads are provided such that one input lead is interconnected to one end portion and one output lead is interconnected to another end portion of each of the wire segments.

5. The method of claim 4 wherein the electrical current is inputted in each of the wire segments through the input leads so as to drive the magnetoelastic film of each wire segment to saturation such that the electrical impedance is sensitive to changes in strain in the material and an electrical signal is outputted from each output lead proportional to a strain imposed on the material surrounding the wire segment to which the output lead is interconnected.

6. The method of claim 1 wherein the magnetoelastic film of the wire has a thickness ranging from about 1 micrometer to about 100 micrometers.

7. The method of claim 1 wherein the magnetoelastic film of the wire is composed of an electrodeposited nickel and iron alloy.

8. The method of claim 1 wherein the magnetoelastic film of the wire is continuous and uniform around the conductive core of the wire.

9. The method of claim 1 wherein the magnetoelastic film of the wire increases the impedance of the wire.

* * * * *